(12) United States Patent  
Chao (10) Patent No.: US 9,690,015 B2  
(45) Date of Patent: Jun. 27, 2017

(54) FLUID LENS ASSEMBLY

(71) Applicant: Oceanus Investment Inc., Mahe Republic of Seychelles (SC)

(72) Inventor: David Chao, Saratoga, CA (US)

(73) Assignee: OCEANUS INVESTMENT INC., Mahe (SC)

(*) Notice: Subject to any disclaimer, the term of this patent is extended or adjusted under 35 U.S.C. 154(b) by 337 days.

(21) Appl. No.: 14/662,985

(22) Filed: Mar. 19, 2015

(65) Prior Publication Data

US 2016/0274278 A1  Sep. 22, 2016

(51) Int. Cl.
| | |
|---|---|
| *G02B 1/06* | (2006.01) |
| *G02B 3/12* | (2006.01) |
| *G02B 3/14* | (2006.01) |
| *G02C 7/08* | (2006.01) |

(52) U.S. Cl.  
CPC .............. *G02B 3/14* (2013.01); *G02C 7/085* (2013.01); *G02C 2202/22* (2013.01)

(58) Field of Classification Search  
CPC ....... G02B 3/14; G02C 7/085; G02C 2202/22  
See application file for complete search history.

(56) References Cited

U.S. PATENT DOCUMENTS

| | | | | |
|---|---|---|---|---|
| 7,085,065 B2* | 8/2006 | Silver | ............... | G02C 7/085 359/665 |
| 8,414,121 B2* | 4/2013 | Gupta | ............... | G02C 7/085 351/159.52 |
| 2011/0085131 A1* | 4/2011 | Gupta | ............... | G02B 3/14 351/159.6 |
| 2016/0274379 A1* | 9/2016 | Chao | ............... | G02C 7/085 |

* cited by examiner

*Primary Examiner* — Bumsuk Won  
*Assistant Examiner* — Tamara Y Washington  
(74) *Attorney, Agent, or Firm* — Hamre, Schumann, Mueller & Larson, P.C.

(57) ABSTRACT

A fluid lens assembly includes: a first lens having a first lens-viewing center; a second lens having a rear concave portion that defines a rear recess and a second lens-viewing center which is aligned with the first lens-viewing center along a viewing axis; and a membrane that is stacked between the first lens and the second lens, that covers the rear recess, that has a membrane-view center, and that cooperates with the first lens to define an accommodating space therebetween for receiving a fluid layer. The membrane wraps around a periphery of the rear recess and is deformed into the rear recess such that the membrane-viewing center is kept aligned with the first lens-viewing center along the viewing axis during inflation of the membrane.

16 Claims, 11 Drawing Sheets

FLUID LENS ASSEMBLY

FIELD

This disclosure relates to a fluid lens assembly, more particularly to a fluid lens assembly including first and second lenses, a fluid layer and a membrane disposed between the first and second lenses and inflatable into a rear recess in the second lens.

BACKGROUND

U.S. Pat. No. 7,085,065 discloses a conventional fluid lens assembly that includes a rigid sheet serving as a lens, first and second rings secured to the rigid sheet, and a membrane retained between the first and second rings. A liquid may fill a space between the membrane and the rigid sheet so as to vary the focus of the lens.

Figure 1:
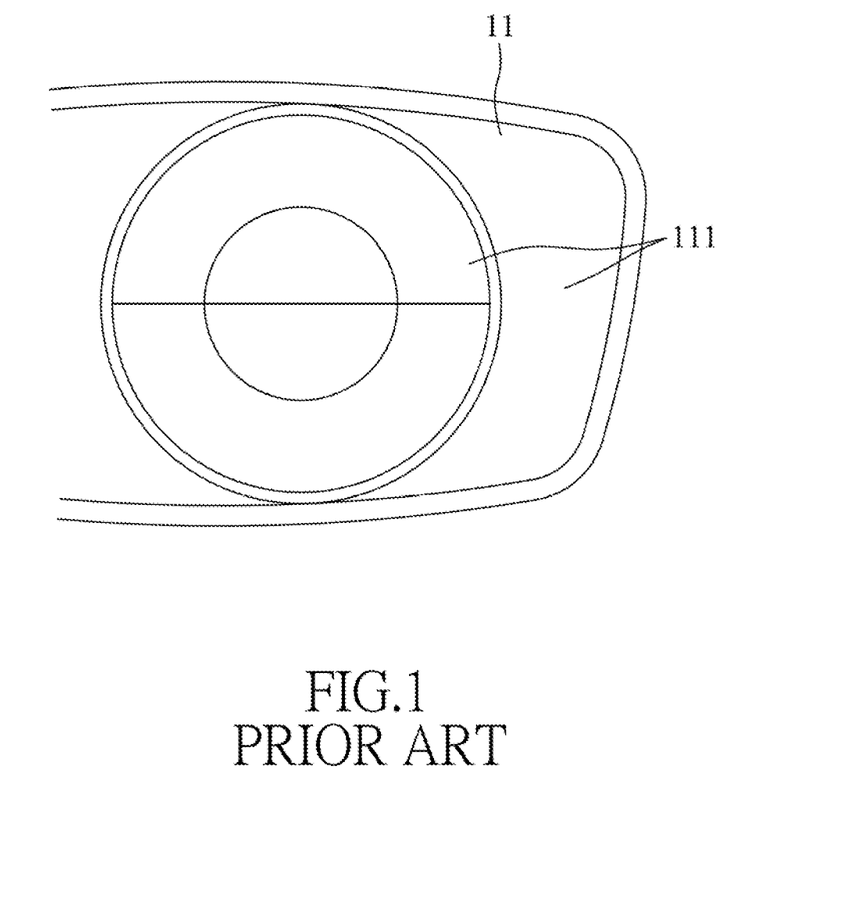
FIG. 1 is a schematic view of a conventional fluid lens assembly.

U.S. Pat. No. 8,414,121 discloses another conventional fluid lens assembly (see FIG. 1) that includes a rigid optical lens (not shown) made of glass or plastic, a flexible contoured membrane 1 stretched over an edge of the optical lens, and a fluid (not shown) filling a cavity between the optical lens and the membrane 11. The membrane 11 includes thickness contours 111 with each thickness contour being an area of differing thickness so as to reduce optical aberrations (mainly astigmatism) of the fluid lens assembly.

The membrane 11 disclosed in U.S. Pat. No. 8,414,121 is relatively complicate and difficult to manufacture.

SUMMARY

Therefore, the object of the present disclosure is to provide a fluid lens assembly that can improve the optical aberrations and that can overcome the aforesaid drawback associated with the prior art.

According to one aspect of this disclosure, there is provided a fluid lens assembly that includes: a first lens having a first lens-viewing center and a front peripheral portion that surrounds the first lens-viewing center; a second lens having a rear concave portion and a peripheral flange portion that extends from and that surrounds the rear concave portion, the peripheral flange portion being stacked on the front peripheral portion, the rear concave portion defining a rear recess and having a second lens-viewing center that is aligned with the first lens-viewing center along a viewing axis; and a membrane unit including a flexible membrane that is stacked between the first lens and the second lens, that covers the rear recess, and that cooperates with the first lens to define an accommodating space therebetween. The accommodating space is adapted to receive a fluid layer of a fluid. The membrane has a membrane-viewing center that is aligned with the first lens-viewing center along the viewing axis. The membrane is inflatable so as to be inflated into the rear recess when the fluid is introduced into the accommodating space to cause an increase in the volume of the fluid layer. The membrane wraps over and around the periphery of the rear recess and is deformed into the rear recess such that the membrane-viewing center is kept aligned with the first lens-viewing center along the viewing axis during inflation of the membrane.

According to another aspect of this disclosure, there is provided a fluid lens assembly that includes: a first lens; a second lens having a rear concave portion and a peripheral flange portion that extends from and that surrounds the rear concave portion, the peripheral flange portion being stacked on the first lens, the rear concave portion defining a rear recess; and a flexible membrane that is stacked between the first lens and the second lens, that covers the rear recess, and that cooperates with the first lens to define an accommodating space therebetween, the accommodating space being adapted to receive a fluid layer of a fluid. The membrane is inflatable so as to be inflated into the rear recess when the fluid is introduced into the accommodating space to cause an increase in the volume of the fluid layer.

BRIEF DESCRIPTION OF THE DRAWINGS

In drawings which illustrate embodiments of the disclosure.

DETAILED DESCRIPTION

Figure 2:
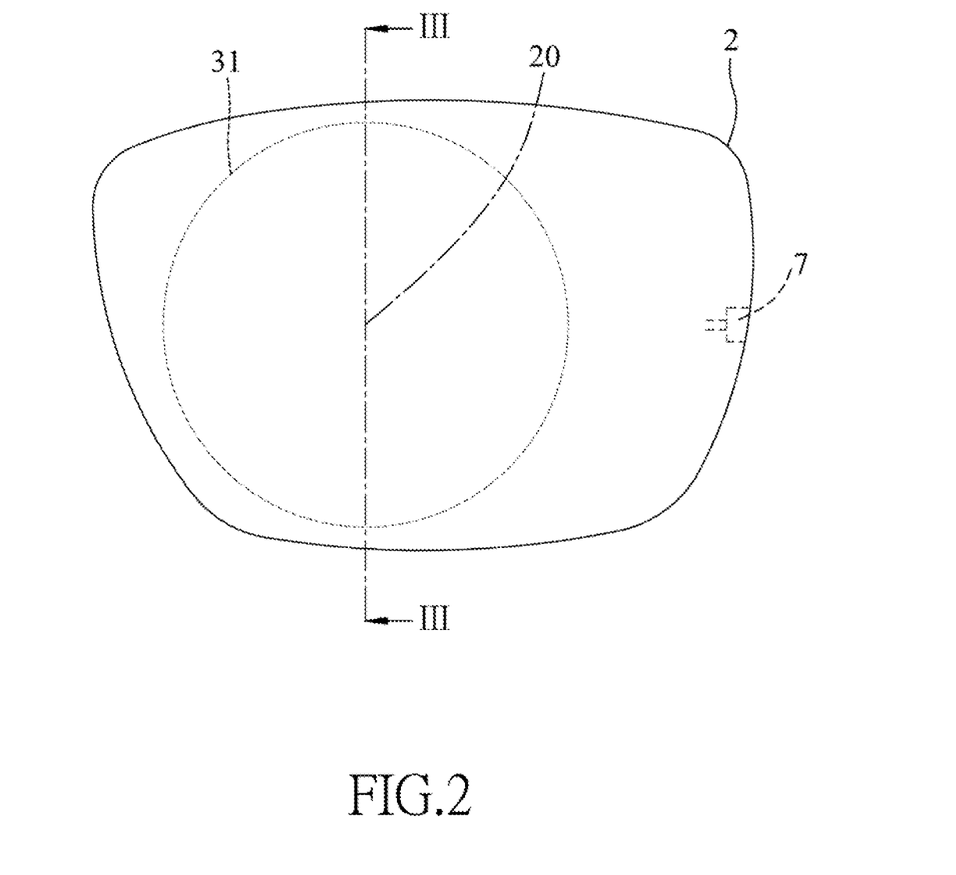
FIG. 2 is a schematic view of the first embodiment of a fluid lens assembly of the disclosure.
Figure 3:
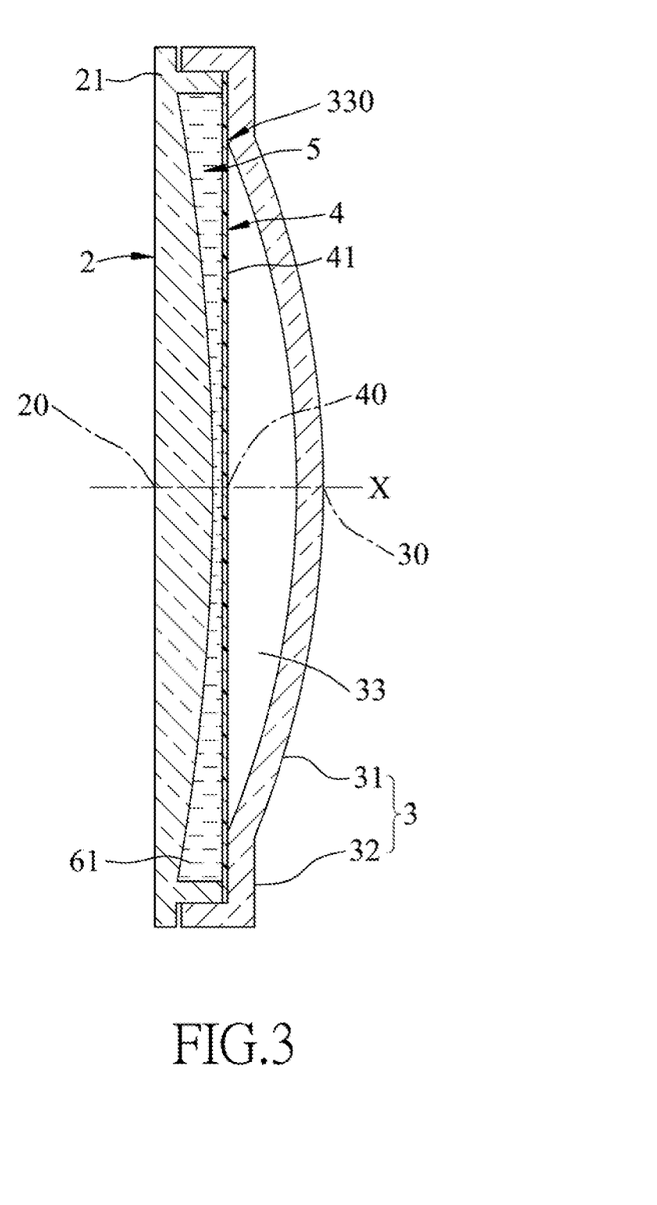
FIG. 3 is a sectional view of the first embodiment taken along the line III-III of FIG. 2.

FIGS. 2 and 3 illustrate the first embodiment of a fluid lens assembly of an eyeglass according to the disclosure. The fluid lens assembly may be capable of providing correction of spherical and astigmatic errors and varying optical power without causing undesired shifting of a viewing center or a focus center of a membrane of the fluid lens assembly.

The fluid lens assembly includes: a first lens 2 having a first lens-viewing center 20 and a front peripheral portion 21 that surrounds the first lens-viewing center 20; a second lens 3 having a rear concave portion 31 and a peripheral flange portion 32 that extends from and that surrounds the rear concave portion 31, the peripheral flange portion 32 being stacked on the front peripheral portion 21, the rear concave portion 31 defining a rear recess 33 and having a second lens-viewing center 30 that is aligned with the first lens-viewing center 20 along a viewing axis (X); and a membrane unit 4 including a flexible first membrane 41 that is stacked between the first lens 2 and the second lens 3, that covers the rear recess 33, and that cooperates with the first lens 2 to define an accommodating space 5 therebetween. The accommodating space 5 is adapted to receive a first fluid layer 61 of a fluid.

Figure 4:
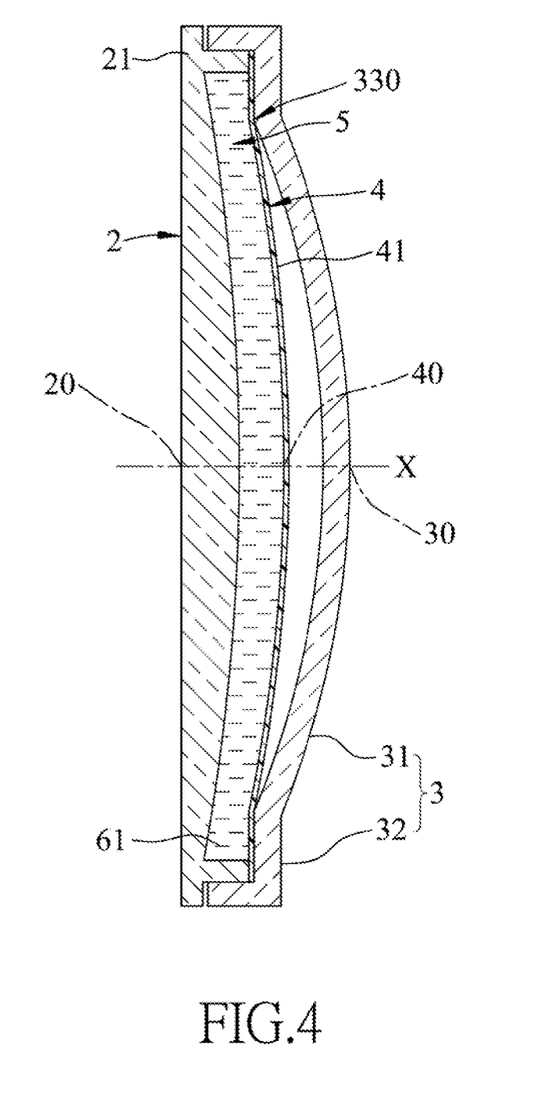
FIG. 4 is a sectional view of the first embodiment illustrating a state in which a membrane is inflated into a rear recess in a second lens of the first embodiment.

The first membrane 41 has a membrane-viewing center 40 that is aligned with the first lens-viewing center 20 along the viewing axis (X). The first membrane 41 is inflatable so as to be inflated into the rear recess 33 (see FIG. 4) when the fluid is introduced into the accommodating space 5 to cause an increase in the volume of the first fluid layer 61. As illustrated in FIG. 4, the first membrane 41 abuts directly against a periphery 330 of the rear recess 33, wraps over and around the periphery 330 of the rear recess 33 and is deformed along and over the entire periphery 330 of the rear recess 33 into the rear recess 33 such that the membrane-viewing center 40 is kept aligned with the first lens-viewing center 20 along the viewing axis (X) during inflation of the first membrane 41, thereby permitting variation of the focus of the fluid lens assembly and reduction of optical aberrations (mainly astigmatism) of the fluid lens assembly.

In this embodiment, the rear concave portion 31 has a shape of a spherical curvature and a cross-section that is circular in shape.

A conduit-connection port 7 is formed on one of the first lens 2 and the second lens 3, and is adapted to be connected to a fluid source (not shown) for passage of the fluid into and out of the accommodating space 5.

Figure 5:
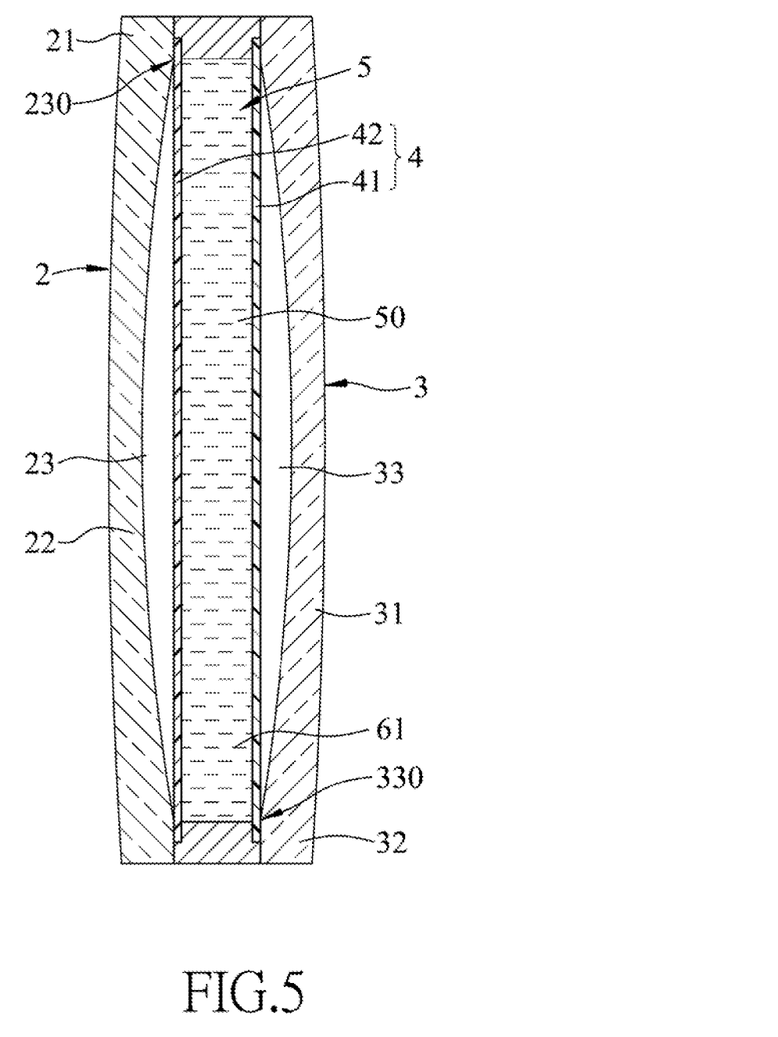
FIG. 5 is a sectional view of the second embodiment of the fluid lens assembly according to the disclosure.
Figure 6:
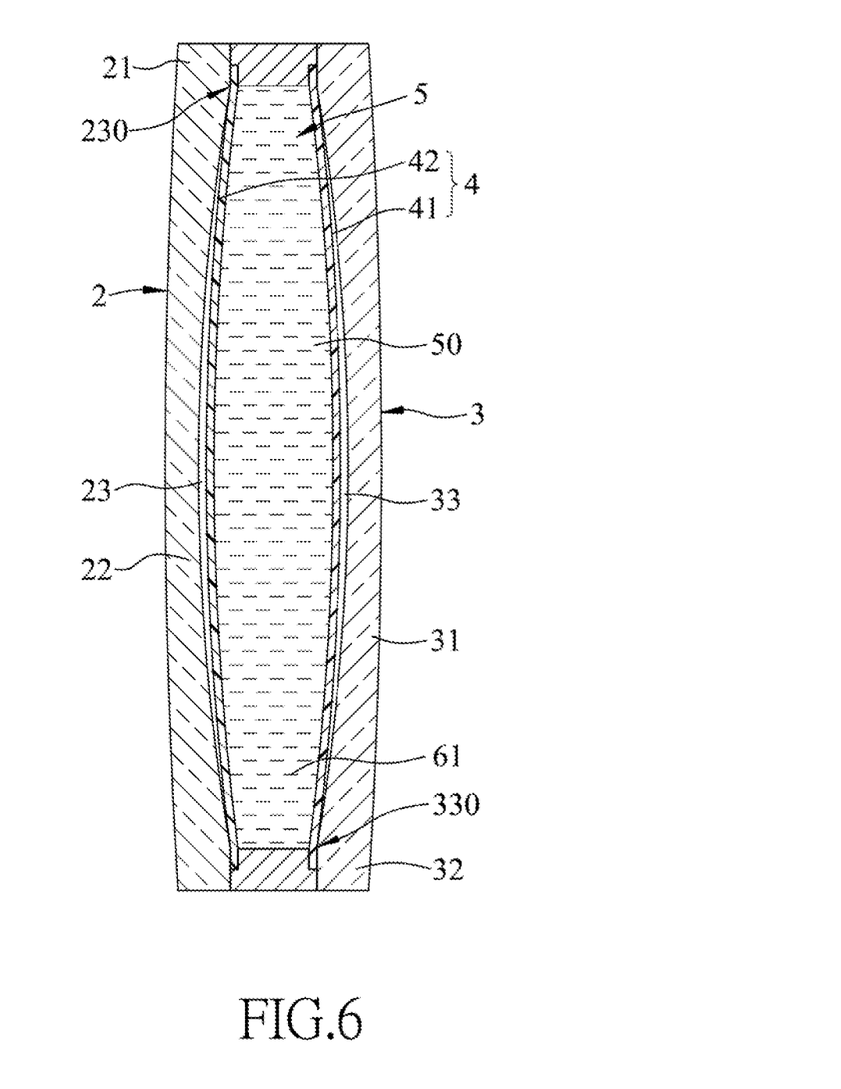
FIG. 6 is a sectional view of the second embodiment illustrating a state in which first and second membranes are respectively inflated into front and rear recesses in first and second lenses of the second embodiment.

FIG. 5 illustrates the second embodiment of the fluid lens assembly according to the disclosure. The second embodiment differs from the previous embodiment in that the first lens 2 further has a front concave portion 22 and that the membrane unit 4 further includes a flexible second membrane 42 disposed in the accommodating space 5. The front concave portion 22 extends from and is surrounded by the front peripheral portion 21, and defines a front recess 23 which is aligned with the rear recess 33 along the viewing axis (X). The flexible second membrane 42 is disposed between the first membrane 41 and the first lens 2, is stacked on the first lens 2, and is spaced apart from and cooperates with the first membrane 41 to define therebetween a gap 50 for accommodating the first fluid layer 61 therein. The first and second membranes 41, 42 are inflatable so as to be respectively inflated into the rear recess 33 and the front recess 23 (see FIG. 6) when the fluid is introduced into the gap 50 to cause an increase in the volume of the first fluid layer 61. The second membrane 42 is abuttable against a periphery 230 of the front recess 23 and deformable over and along the periphery of the front recess 23 into the front recess 23 when being inflated.

Figure 7:
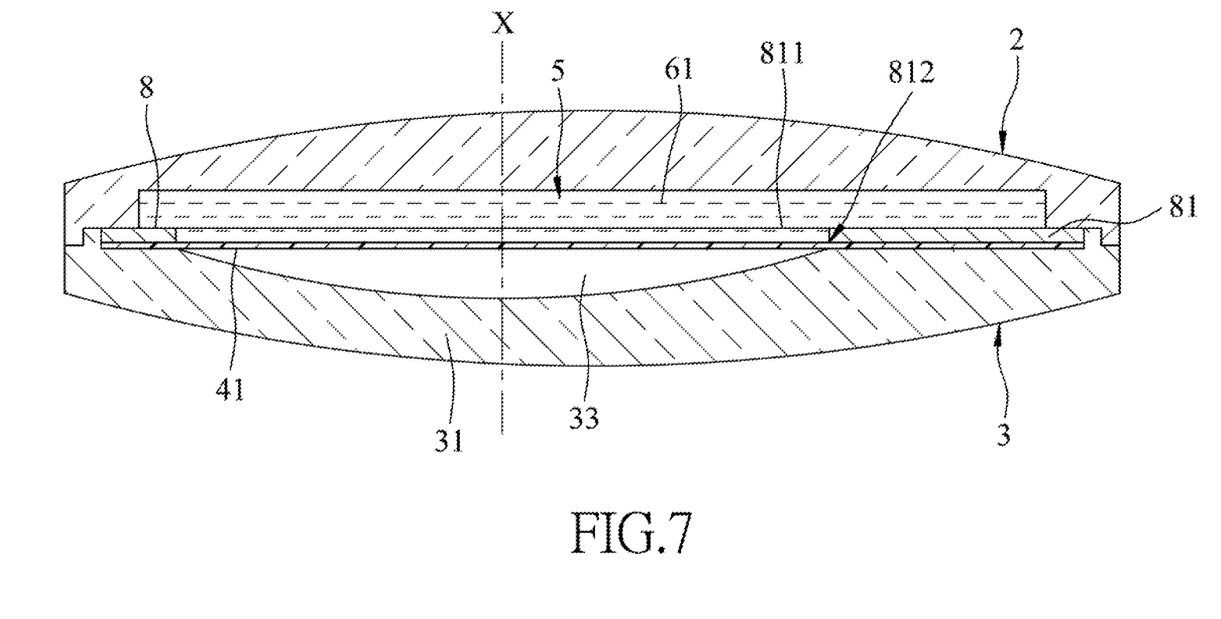
FIG. 7 is a sectional view of the third embodiment of the fluid lens assembly according to the disclosure.
Figure 8:
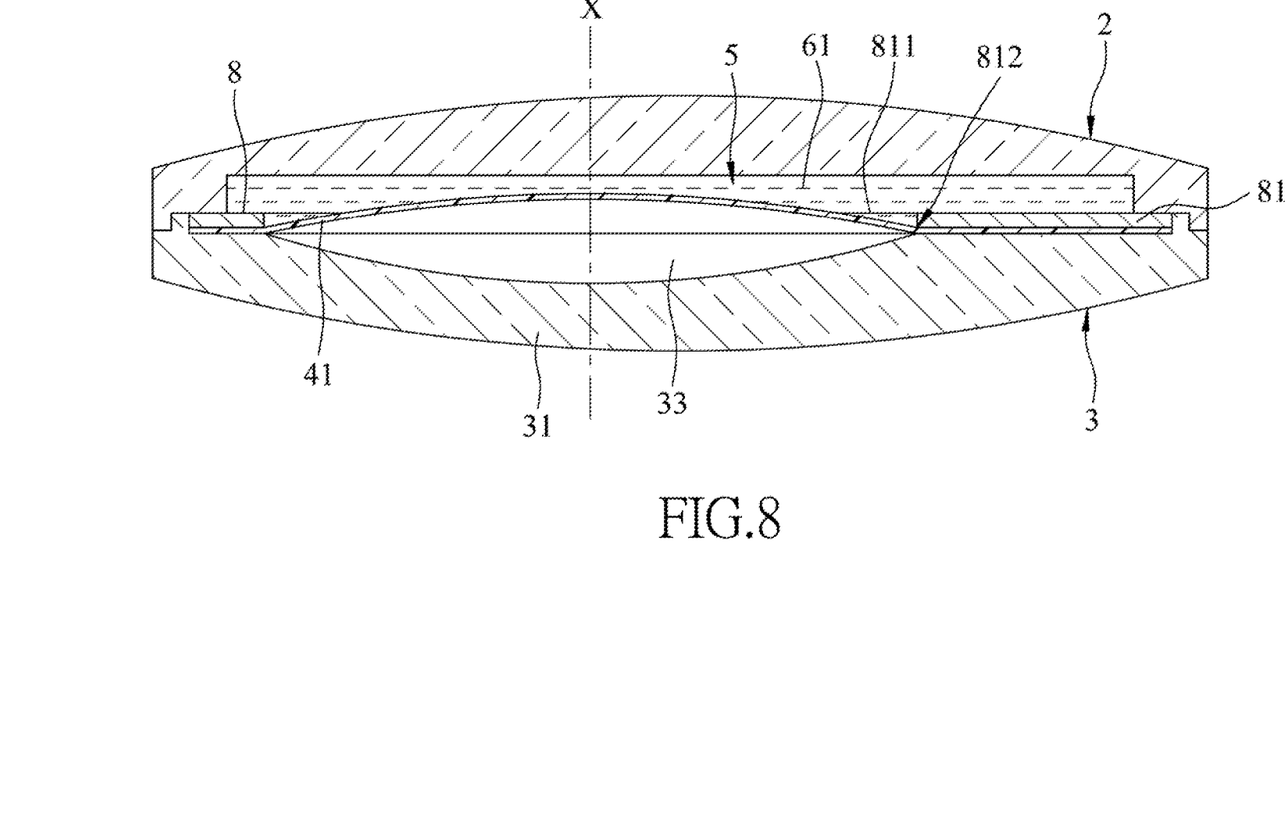
FIG. 8 is a sectional view of the third embodiment illustrating a state in which a membrane is inflated into a restricting hole in a restricting sheet of the third embodiment.

FIG. 7 illustrates the third embodiment of the fluid lens assembly according to the disclosure. The third embodiment differs from the first embodiment in that the third embodiment further includes a restricting unit 8 disposed in the accommodating space 5. In this embodiment, the restricting unit 8 includes a first restricting sheet 81 which is stacked between the first membrane 41 and the first lens 2. The first restricting sheet 81 is formed with a first restricting hole 811 that is aligned with the rear concave portion 31 along the viewing axis (X). The first membrane 41 abuts against a periphery 812 of the first restricting hole 811, and is deformed along the periphery 812 of the first restricting hole 811 into the first restricting hole 811 in a direction away from the second lens 3 (see FIG. 8) when the fluid is withdrawn from the accommodating space 5 to generate a negative pressure in the accommodating space 5.

Figure 9:
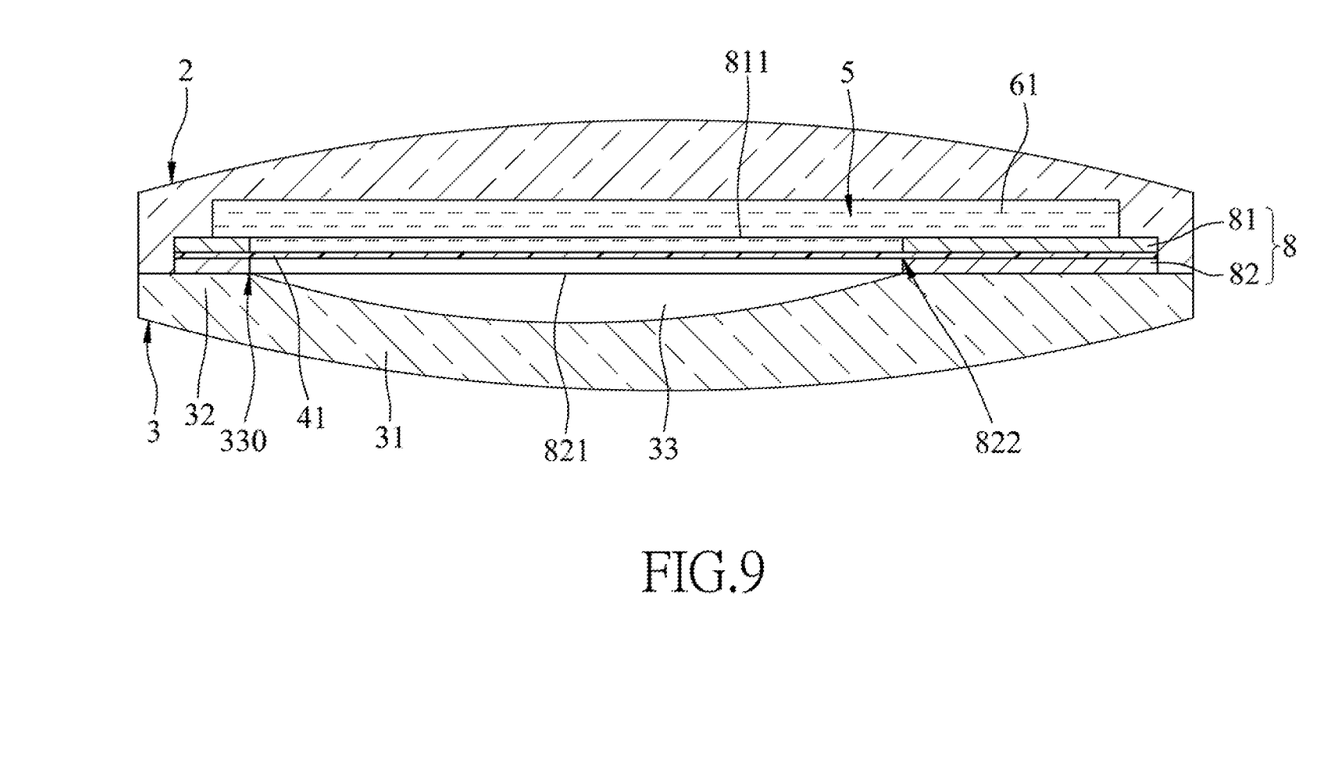
FIG. 9 is a sectional view of the fourth embodiment of the fluid lens assembly according to the disclosure.
Figure 10:
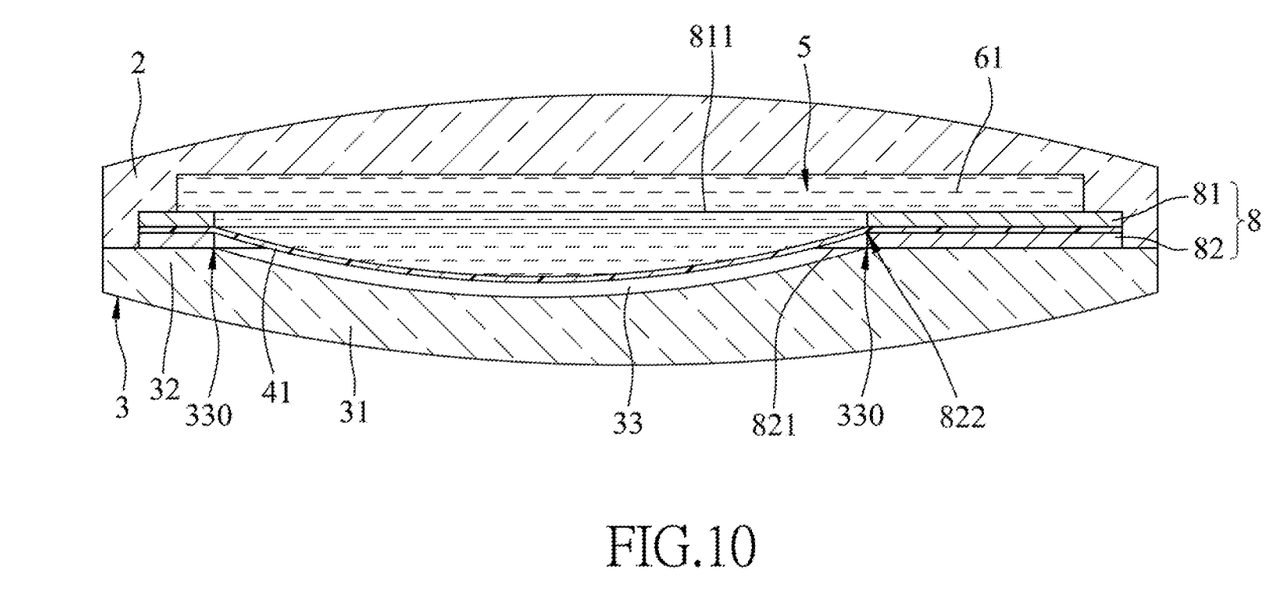
FIG. 10 is a sectional view of the fourth embodiment illustrating a state in which a membrane is inflated through a restricting hole in a restricting sheet and into a rear recess in a second lens of the fourth embodiment.

FIG. 9 illustrates the fourth embodiment of the fluid lens assembly according to the disclosure. The fourth embodiment differs from the third embodiment in that the restricting unit 8 further includes a second restricting sheet 82 which is stacked between the first membrane 41 and the second lens 3. The second restricting sheet 82 is formed with a second restricting hole 821 that is aligned with the first restricting hole 811 along the viewing axis (X). The first membrane 41 is sandwiched between the first and second restricting sheets 81, 82. In this embodiment, as illustrated in FIG. 10, the first membrane 41 presses against a periphery of the second restricting hole 822 to abut indirectly against the periphery 330 of the rear recess 33, wraps over and around the periphery 330 of the rear recess 33, and is deformed through the second restricting hole 822 and into the rear recess 33 during inflation of the first membrane 41.

Figure 11:
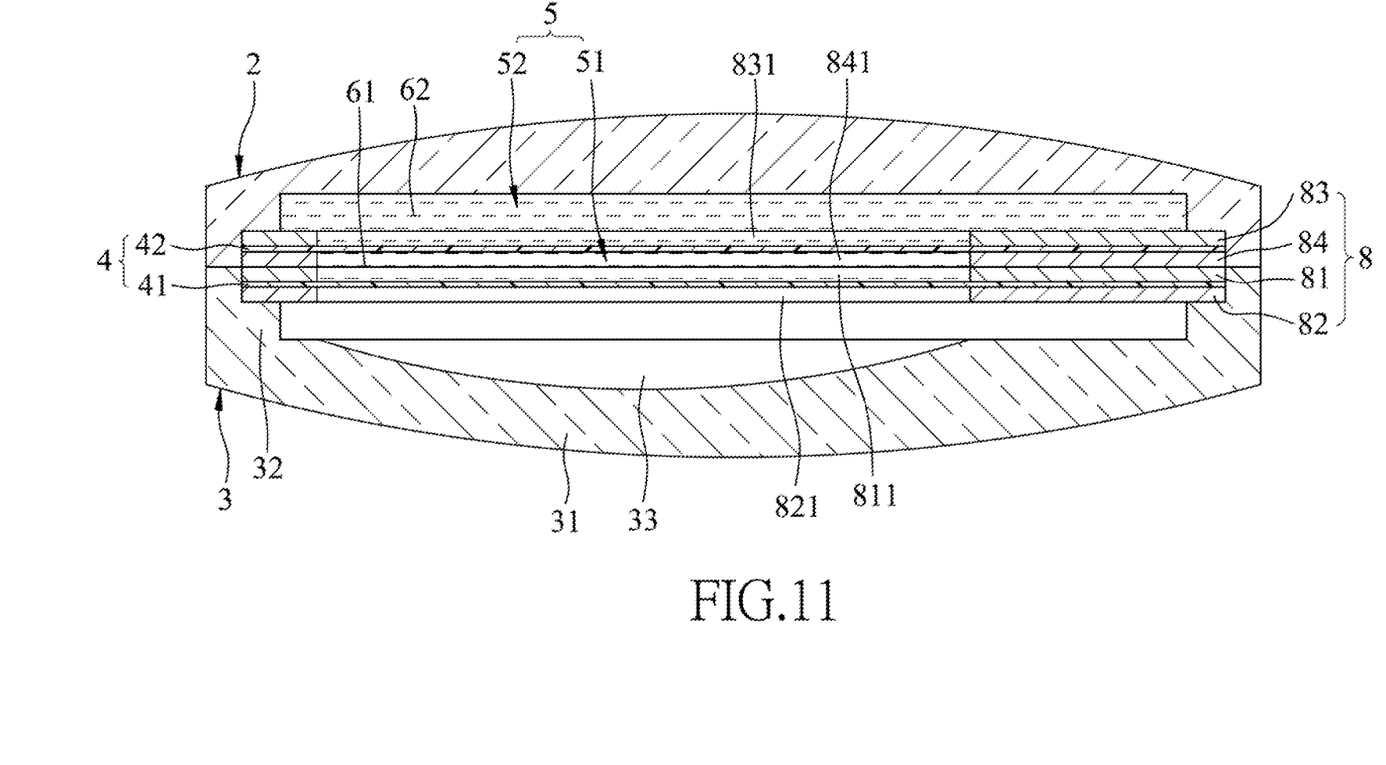
FIG. 11 is a sectional view of the fifth embodiment of the fluid lens assembly according to the disclosure.

FIG. 11 illustrates the fifth embodiment of the fluid lens assembly according to the disclosure. The fifth embodiment differs from the fourth embodiment in that the membrane unit 4 further includes a flexible second membrane 42 and that the restricting unit 8 further includes third and fourth restricting sheets 83, 84. The third and fourth restricting sheets 83, 84 are disposed between the first restricting sheet 81 and the first lens 2. The second membrane 42 is sandwiched between the third and fourth restricting sheets 83, 84, and divides the accommodating space 5 into a first compartment 51 that extends between the first and second membranes 41, 42 and that is adapted to receive the first fluid layer 61, and a second compartment 52 that extends between the first lens 2 and the second membrane 42 and that is adapted to receive a second fluid layer 62. The first and fourth restricting sheets 81, 84 contact each other and are disposed in the first compartment 51, while the third restricting unit 83 is disposed in the second compartment 52. The first and second compartments 51, 52 are not in fluid communication with each other, so that the first and second fluid layers 61, 62 are independent to each other.

With the inclusion of the second lens 3 having a rear concave portion 31 in the fluid lens assembly of the disclosure, the aforesaid drawbacks associated with the prior art may be alleviated.

While the disclosure has been described in connection with what are considered the most practical embodiments, it is understood that this disclosure is not limited to the disclosed embodiments but is intended to cover various arrangements included within the spirit and scope of the broadest interpretation and equivalent arrangements.

What is claimed is:
1. A fluid lens assembly comprising:
 a first lens having a first lens-viewing center and a front peripheral portion that surrounds said first lens-viewing center;
 a second lens having a rear concave portion and a peripheral flange portion that extends from and that surrounds said rear concave portion, said peripheral flange portion being stacked on said front peripheral portion, said rear concave portion defining a rear recess and having a second lens-viewing center that is aligned with said first lens-viewing center along a viewing axis; and
 a membrane unit including a flexible first membrane that is stacked between said first lens and said second lens, that covers said rear recess, and that cooperates with said first lens to define an accommodating space therebetween, said accommodating space being adapted to receive a first fluid layer of a fluid, said first membrane having a membrane-viewing center that is aligned with said first lens-viewing center along the viewing axis;
 wherein said first membrane is inflatable so as to be inflated into said rear recess when the fluid is intro- duced into said accommodating space to cause an increase in the volume of the first fluid layer; and wherein said first membrane wraps over and around said periphery of said rear recess and is deformed into said rear recess such that said membrane-viewing center is kept aligned with said first lens-viewing center along the viewing axis during inflation of said first membrane.

2. The fluid lens assembly of claim 1, wherein said rear concave portion has a cross-section that is circular in shape.

3. The fluid lens assembly of claim 1, wherein said first lens further has a front concave portion that extends from and that is surrounded by said front peripheral portion and that defines a front recess which is aligned with said rear recess along the viewing axis.

4. The fluid lens assembly of claim 3, wherein said membrane unit further includes a flexible second membrane that is disposed between said first membrane and said first lens, that is stacked on said first lens, and that is spaced apart from and that cooperates with said first membrane to define therebetween a gap for accommodating the first fluid layer therein, said second membrane being inflatable so as to be inflated into said front recess when the fluid is introduced into said gap to cause an increase in the volume of the first fluid layer, said second membrane being abuttable against a periphery of said front recess and deformable along said periphery of said front recess into said front recess when being inflated.

5. The fluid lens assembly of claim 1, further comprising a restricting unit that includes a first restricting sheet which is stacked between said first membrane and said first lens, said first restricting sheet being formed with a first restricting hole that is aligned with said rear concave portion along the viewing axis, said first membrane abutting against a periphery of said first restricting hole and being deformed along said periphery of said first restricting hole into said first restricting hole in a direction away from said second lens when the fluid is withdrawn from said accommodating space to generate a negative pressure in said accommodating space.

6. The fluid lens assembly of claim 5, wherein said restricting unit further includes a second restricting sheet that is stacked between said first membrane and said second lens, said second restricting sheet being formed with a second restricting hole that is aligned with said first restricting hole along the viewing axis, said first membrane being sandwiched between said first and second restricting sheets.

7. The fluid lens assembly of claim 6, wherein said membrane unit further includes a flexible second membrane, said restricting unit further including third and fourth restricting sheets that are disposed between said first restricting sheet and said first lens, said second membrane being sandwiched between said third and fourth restricting sheets, said second membrane dividing said accommodating space into a first compartment that extends between said first and second membranes and that is adapted to receive the first fluid layer, and a second compartment that extends between said first lens and said second membrane and that is adapted to receive a second fluid layer, said first and third restricting sheets being disposed in said first compartment, said fourth restricting unit being disposed in said second compartment.

8. The fluid lens assembly of claim 1, further comprising a conduit-connection port that is formed on one of said first lens and said second lens and that is adapted to be connected to a fluid source for passage of the fluid into and out of said accommodating space.

9. A fluid lens assembly comprising:
a first lens;
a second lens having a rear concave portion and a peripheral flange portion that extends from and that surrounds said rear concave portion, said peripheral flange portion being stacked on said first lens, said rear concave portion defining a rear recess; and
a membrane unit includes a flexible first membrane that is stacked between said first lens and said second lens, that covers said rear recess, and that cooperates with said first lens to define an accommodating space therebetween, said accommodating space being adapted to receive a first fluid layer of a fluid;
wherein said first membrane is inflatable so as to be inflated into said rear recess when the fluid is introduced into said accommodating space to cause an increase in the volume of the fluid layer.

10. The fluid lens assembly of claim 9, wherein said rear concave portion has a cross-section that is circular in shape.

11. The fluid lens assembly of claim 9, wherein said first lens further has a front concave portion that extends from and that is surrounded by said front peripheral portion and that defines a front recess which is aligned with said rear recess along a viewing axis.

12. The fluid lens assembly of claim 11, wherein said membrane unit further includes a flexible second membrane that is disposed between said first membrane and said first lens, that is stacked on said first lens, and that is spaced apart from and that cooperates with said first membrane to define therebetween a gap for accommodating the first fluid layer therein, said second membrane being inflatable so as to be inflated into said front recess when the fluid is introduced into said gap to cause an increase in the volume of the first fluid layer, said second membrane being abuttable against a periphery of said front recess and deformable along said periphery of said front recess into said front recess when being inflated.

13. The fluid lens assembly of claim 9, further comprising a restricting unit that includes a first restricting sheet which is stacked between said first membrane and said first lens, said first restricting sheet being formed with a first restricting hole that is aligned with said rear concave portion along a viewing axis, said first membrane abutting against a periphery of said first restricting hole and being deformed along said periphery of said first restricting hole into said first restricting hole in a direction away from said second lens when the fluid is withdrawn from said accommodating space to generate a negative pressure in said accommodating space.

14. The fluid lens assembly of claim 13, wherein said restricting unit further includes a second restricting sheet that is stacked between said first membrane and said second lens, said second restricting sheet being formed with a second restricting hole that is aligned with said first restricting hole along the viewing axis, said first membrane being sandwiched between said first and second restricting sheets.

15. The fluid lens assembly of claim 14, wherein said membrane unit further includes a flexible second membrane, said restricting unit further including third and fourth restricting sheets that are disposed between said first restricting sheet and said first lens, said second membrane being sandwiched between said third and fourth restricting sheets, said second membrane dividing said accommodating space into a first compartment that extends between said first and second membranes and that is adapted to receive the first fluid layer, and a second compartment that extends between said first lens and said second membrane and that is adapted to receive a second fluid layer, said first and third restricting sheets being disposed in said first compartment, said fourth restricting unit being disposed in said second compartment.

16. The fluid lens assembly of claim 9, further comprising a conduit-connection port that is formed on one of said first lens and said second lens and that is adapted to be connected to a fluid source for passage of the fluid into and out of said accommodating space.

\* \* \* \* \*